United States Patent
Zinner

(10) Patent No.: US 11,252,107 B2
(45) Date of Patent: Feb. 15, 2022

(54) METHOD FOR OPERATING AN ETHERNET COMMUNICATION DEVICE, AND ETHERNET COMMUNICATION DEVICE

(71) Applicant: CONTINENTAL AUTOMOTIVE GMBH, Hannover (DE)

(72) Inventor: Helge Zinner, Munich (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/762,231

(22) PCT Filed: Nov. 7, 2018

(86) PCT No.: PCT/EP2018/080443
§ 371 (c)(1),
(2) Date: May 7, 2020

(87) PCT Pub. No.: WO2019/092006
PCT Pub. Date: May 16, 2019

(65) Prior Publication Data
US 2020/0267096 A1    Aug. 20, 2020

(30) Foreign Application Priority Data

Nov. 7, 2017 (DE) ..................... 10 2017 219 770.6

(51) Int. Cl.
*H04L 12/931* (2013.01)
*H04L 29/08* (2006.01)

(52) U.S. Cl.
CPC .......... *H04L 49/503* (2013.01); *H04L 49/351* (2013.01); *H04L 67/12* (2013.01)

(58) Field of Classification Search
CPC ..... H04L 49/35; H04L 49/351; H04L 49/503; H04L 67/12
See application file for complete search history.

(56) References Cited

U.S. PATENT DOCUMENTS 9,843,926 B2  12/2017 Dietz et al.
10,110,599 B2 10/2018 Schmidt et al.
(Continued)

FOREIGN PATENT DOCUMENTS

CN  101119190 A  2/2008
CN  105471848 A  4/2016
(Continued)

OTHER PUBLICATIONS

Anonymous: "AN12088 Application hints for TJA1100 Automotive Ethernet PHY", Aug. 28, 2017, pp. 1-67, XP055541510, Found on the internet: Jan. 14, 2019, URL: https://www.nxp.com/docs/en/application-note/AN12088.pdf.
Anonymous, "Understanding Storm Control on EX Series Switches—Technical Documentation—Support—Juniper Networks", Oct. 1, 2017, pp. 1-2, XP055541594, Found on the internet: Jan. 14, 2019, URL: https://web.archive.org/web/20171001160932/https://www.juniper.net/documentation/en_US/junos/topics/concept/rate-limiting-storm-control-understanding.html.

*Primary Examiner* — Normin Abedin
(74) *Attorney, Agent, or Firm* — Laurence A. Greenberg; Werner H. Stemer; Ralph E. Locher

(57) ABSTRACT

A method for operating an Ethernet communication device having multiple external physical interfaces for a motor vehicle includes the following steps: detecting a special state on at least one of the interfaces, generating a control signal to adapt the interface in the special state if the special state is detected; and blocking a forwarding of a message packet arriving on the interface in the special state to a media access control unit of the Ethernet communication device on the basis of the control signal.

14 Claims, 6 Drawing Sheets

(56) References Cited

U.S. PATENT DOCUMENTS

| | | | |
|---|---|---|---|
| 10,321,319 B2 | 6/2019 | Gennermann | |
| 2006/0282892 A1 | 12/2006 | Jonnala et al. | |
| 2007/0147354 A1* | 6/2007 | He | H04L 12/10 370/352 |
| 2015/0131681 A1* | 5/2015 | Balbierer | H04L 12/12 370/477 |
| 2015/0143144 A1* | 5/2015 | Balbierer | H04L 12/40039 713/320 |
| 2015/0236940 A1* | 8/2015 | Zinner | H04L 12/40136 709/224 |
| 2016/0173344 A1* | 6/2016 | Zinner | H04L 41/24 370/245 |
| 2017/0093866 A1* | 3/2017 | Ben-Noon | H04L 63/10 |
| 2018/0309656 A1* | 10/2018 | Regev | G06F 11/273 |

FOREIGN PATENT DOCUMENTS

| | | |
|---|---|---|
| DE | 102010008816 A1 | 8/2011 |
| DE | 102013225755 A1 | 6/2015 |
| DE | 102015002574 A1 | 9/2016 |
| DE | 102015105595 A1 | 10/2016 |
| EP | 3148236 A1 | 3/2017 |
| WO | 0219661 A2 | 3/2002 |

* cited by examiner

METHOD FOR OPERATING AN ETHERNET COMMUNICATION DEVICE, AND ETHERNET COMMUNICATION DEVICE

BACKGROUND OF THE INVENTION

Field of the Invention

The invention relates to a method for operating an Ethernet communication device having multiple external physical interfaces for a motor vehicle. The invention also relates to an Ethernet communication device for a motor vehicle. The Ethernet communication device has a media access control unit and at least one external physical interface.

Ethernet communication devices are known. As such, the Ethernet communication device is known as a switch diverter or network switch, for example. A switch denotes a coupling element that connects network segments to one another. It ensures that data packets, what are known as frames, within a network segment reach their destination.

The Ethernet communication device is used in the Ethernet. Ethernet is a technique that specifies software, for example protocols, and hardware, for example cables, distributors or network cards, for cable-based data networks. Ethernet is largely compliant with IEEE Standard 802.3.

SUMMARY OF THE INVENTION

It is an object of the present invention to provide a method and an Ethernet communication device in which or with which the security of the Ethernet communication device is increased.

This object is achieved by a method and an Ethernet communication device according to the independent claims.

In a method according to the invention, an Ethernet communication device for a motor vehicle is operated. The Ethernet communication device has multiple external physical interfaces. The following steps are carried out:
  detecting a special state on at least one of the interfaces;
  generating a control signal to adapt the interface in the special state if the special state is detected; and
  blocking a forwarding of a message packet arriving on the interface in the special state to a media access control unit of the Ethernet communication device on the basis of the control signal.

The invention is based on the insight that an undesirable message packet arriving on the interface can also immediately be rejected on the interface.

In the case of Ethernet communication devices known from the prior art, on the other hand, it is customary for a message packet always to be forwarded from the interface to the media access control unit too. In the media access control unit and/or in a microcontroller of the Ethernet communication device, a decision is then actually made as to how the message packet is supposed to be handled.

An advantage of rejecting the message packet in the interface is that the media access control unit and/or the microcontroller has less work because the message packet is not forwarded thereto if the special state is detected. The Ethernet communication device can thus be operated with less effort and less energy. The Ethernet communication device is in particular in the form of a switch or network switch. The Ethernet communication device can alternatively be in the form of a node or hub.

The interface is in particular in the form of a PHY. PHY stands for physical interface. The PHY is a special integrated circuit or a functional group of a circuit that is responsible for the coding and decoding of data between a pure digital system and a modulated analog system.

The special state is in particular a state in which at least one undesirable message packet arrives or is received on the interface from outside the Ethernet communication device.

The control signal controls in particular whether the interface is transmissive for the message packet or whether the interface is non-transmissive for the message packet, that is to say that the message packet is blocked. The control signal allows the interface to be switched to a non-transmissive mode or, when the special state is terminated, back to a transmissive mode, which is in particular consistent with a normal state of the interface.

The media access control (MAC) unit is an implementation of a layer of the OSI model (open system interconnection model). The data link layer or layer 2 of the OSI model is divided into the sublayers media access control (2a) and logical link control (2b), the MAC mapping the lower of the two layers. The media access control unit or MAC is the second lowest layer of the OSI model and comprises network protocols and components that control how multiple computers divide up the shared physical transmission medium. It is needed because a shared medium cannot be used by multiple computers at the same time without data collisions and hence communication disruptions or data loss occurring.

As a result of the forwarding of the message packet being blocked on the interface, the media access control unit in particular requires no knowledge at all of the message packet that has arrived. The media access control unit is thus screened from the message packet as a result of the forwarding being blocked.

Preferably, there is provision for the forwarding to the media access control unit to be blocked as a result of deactivation of the interface. The deactivation results in the interface being switched off, in particular. It is advantageous that the deactivation of the interface results in energy being saved and the Ethernet communication device having no work with the message packet or else with further message packets. The Ethernet communication device can therefore be operated more securely and more economically.

Alternatively, there is preferably provision for the forwarding to the media access control unit to be blocked as a result of a loop circuit of the interface. Loop circuit can also be referred to as loopback. The loop circuit is a message or information channel having only one end, which means that sender and receiver are identical. The loop circuit can be in a form such that the received message packet is looped back to the sender or the last switching unit and, rather than the message packet, an alarm indication signal is supplied to the destination or the Ethernet communication device. In particular, however, the loop circuit is in a form such that the message packet is looped back just to the sender or to the last switching unit and the media access control unit receives no knowledge at all of the reception of the message packet. The loop circuit is advantageous because the interface can be put (back) into the normal mode, in which a message packet is forwarded to the media access control unit, more quickly when the special state is terminated. The last link partner may become aware of the port being switched off, and the link status would change to an error state in this case. If the port remains on, however, then the link partner on the bottommost level initially does not notice that a loop is active. Another advantage of the loop would be that the port is kept active, that is to say that the system sees that the link is active. If the interface is physically external or sufficiently isolated, then the control device could be restarted in the meantime, run an update in order to handle the error better, confirm the effect of the error, etc. A potential attacker would not become aware of this, because the link continues to exist. The control device behind it would be off or unavailable, however. The loop circuit may therefore not only be a possible embodiment of the blocking but also the concealment of an action behind the port. As such, the loop circuit does not require a wait for a longer startup time for the interface, for example, as can be the case when the interface is deactivated, that is to say in particular switched off completely, for example. The time-saving could be e.g. approximately 100 ms, and a reconfiguration could also be saved as a result.

Furthermore, there is preferably provision for the special state to be detected if a number of received message packets within a predetermined period is greater than a message packet limit value. The Ethernet communication device can be attacked as a result of an excessive number of message packets on the basis of the DDoS (Distributed Denial of Service) principle, for example. The attack can overload the Ethernet communication device, for example, so that proper operation of the Ethernet communication device can no longer be maintained or else the Ethernet communication device needs to be restarted. As a result of the message packet limit value being stipulated, it is possible, by way of example, to determine up to what number of received message packets within the predetermined period a normal state of the Ethernet communication device can be assumed, that is to say up to what number of message packets the Ethernet communication device can be operated properly or else what number of message packets are normally received without assuming an attack.

Furthermore, there is preferably provision for the special state to be detected if the Ethernet communication device is still in a starting mode characterized by a loading process of the Ethernet communication device. Similarly, the interface could always immediately be put into the loop mode until the configuration of the communication device is complete. The interface could also be wakeable via the line, that is to say by the link partner, and it could therefore be advantageous if the interface is also configured in this case first without waiting for a signal from the upper layers. As an example, the remote wakeup according to the "OPEN Alliance TC10" standard would be relevant. As such, the special state can also be present if the Ethernet communication device has not yet started or run up completely, for example. Not all of the services or components of the Ethernet communication device are then operational, in particular. In the starting mode, it is advantageous to block the forwarding of the message packet to the media access control unit in order to use instantaneously available computing power of the Ethernet communication device for the boot process or the loading process. The Ethernet communication device can be started more quickly and be completely operational more quickly as a result.

Furthermore, there is preferably provision for the special state to be detected if a message packet memory of the Ethernet communication device is full. The message packet memory can exist, by way of example, as a temporary buffer, for example also as a buffer memory in which message packets are buffer-stored until they are processed further by the Ethernet communication device. If the message packet memory is full, it can be useful to block the forwarding of newly arriving message packets to the media access control unit. It is then in turn advantageous to block the message packets at the interface already in order to relieve the load on the media access control unit.

Furthermore, there is preferably provision for the special state to be detected if the Ethernet communication device is in an update mode. As an example, the special state can be detected as a result of the Ethernet register being written to or read again, or the memory area responsible therefor being replaced. In the update mode, a firmware of the Ethernet communication device is updated, for example. During the update mode, it may be that the Ethernet communication device is busy with the update and is unable to process the arriving message packet further, or the update is delayed thereby. The update can also be understood as a mitigation mode that is started after a problem has occurred on the interface, and accordingly this interface needs to be updated thereafter. By way of example, this could involve the quality of service parameters being changed on the media access control unit (input filter, VLAN, etc.). It is thus advantageous to block the message packet right at the interface and not to forward it on to at least the media access control unit, in order to be able to perform the update mode more securely and more quickly.

Furthermore, there is preferably provision for the control signal to be generated by a microcontroller integrated in the Ethernet communication device. As such, the Ethernet communication device itself can generate the control signal. Preferably, the Ethernet communication device can also itself detect the special state on the interface. An advantage of the control signal being generated by the integrated microcontroller is that the Ethernet communication device can be operated autonomously, that is to say independently of other communication devices in the Ethernet or on-board electrical system of the motor vehicle. Moreover, this results in only low latencies on the basis of transmission paths of the control signal. The blocking of the forwarding of the message packet on the interface can be effected more quickly as a result.

Alternatively, there can be provision for the control signal to be generated by a microcontroller in a form external to the Ethernet communication device, and for the control signal generated in the microcontroller in the external form to be transmitted to the Ethernet communication device via an unblocked interface of the interfaces of the Ethernet communication device. The microcontroller in the external form can exist in a further Ethernet communication device of the Ethernet, for example. The microcontroller in the external form generates the control signal outside the Ethernet communication device and transmits it to the Ethernet communication device via the unblocked interface. The unblocked interface corresponds to an interface that can be addressed differently than the interface that is blocked or being attacked. The unblocked interface via which the control signals are transmitted thus ideally does not have to be an Ethernet interface, but rather can be an I2S, SPI, PCIe or the like, for example—as such, errors/attacks occurring by multicast or the like cannot be transmitted in a different system without a gateway. Here, it is also possible for a conscious decision to be made to send the control signals via an interface that is of a different type, that is to say in which the messages/receiver addressing is different. In a first step, the type of interface via which the unwanted communication or attack is effected is identified, and in a second step, a different type of interface is chosen.

It is advantageous that the interface can also be controlled from outside the Ethernet communication device if the Ethernet communication device is overloaded or is affected by an attack or else has partly failed, for example. Preferably, the Ethernet communication device thus has the interface on which the message packet arrives and that is blocked for a forwarding of the message packet on the basis of the special state. Moreover, the Ethernet communication device preferably has at least the unblocked interface at which at least the control signal is received and is also forwarded to the microcontroller or to a media access control unit.

The invention also relates to an Ethernet communication device for a motor vehicle. The Ethernet communication device has a media access control unit and at least one external physical interface. In particular, the interface is connected to the media access control unit by means of a data line for data transmission purposes. As an important concept, there is provision for the Ethernet communication device to be configured to block a forwarding of a message packet arriving on the interface in a special state of the Ethernet communication device to a media access control unit of the Ethernet communication device on the basis of a control signal.

Advantageous embodiments of the method according to the invention can be regarded as advantageous embodiments of the Ethernet communication device. The relevant components of the Ethernet communication device are each designed to perform the respective method steps.

Further features of the invention emerge from the claims, the figures and the description of the figures.

Exemplary embodiments of the invention will be explained in more detail below on the basis of schematic drawings.

BRIEF DESCRIPTION OF THE SEVERAL VIEWS OF THE DRAWING

In the figures, identical or functionally identical elements are provided with identical reference signs.

DETAILED DESCRIPTION OF THE INVENTION

Figure 1:
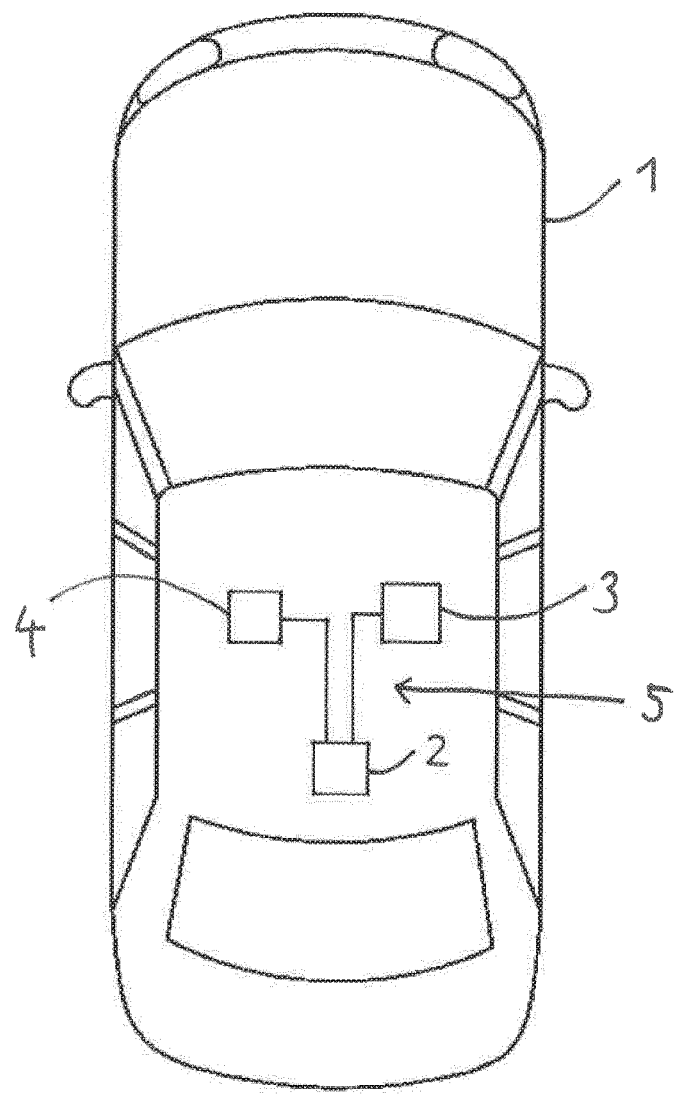
FIG. 1 shows a schematic plan view of a motor vehicle having an exemplary embodiment of an Ethernet communication device according to the invention.

FIG. 1 shows a motor vehicle 1 having an Ethernet communication device 2. The Ethernet communication device 2 is connected, according to the exemplary embodiment, to a further Ethernet communication device 3 and a control unit 4 of the motor vehicle 1 for data transmission purposes. For connecting the further Ethernet communication device 3 and the control unit 4 to the Ethernet communication device 2, the Ethernet communication device 2 has multiple external physical interfaces.

The motor vehicle 1 can be in the form of a passenger vehicle or utility vehicle, for example.

The Ethernet communication device 2 and the further Ethernet communication device 3 and also the control unit 4 are operated in an on-board electrical system 5 of the motor vehicle 1, which is in the form of an Ethernet on-board electrical system.

Figure 2:
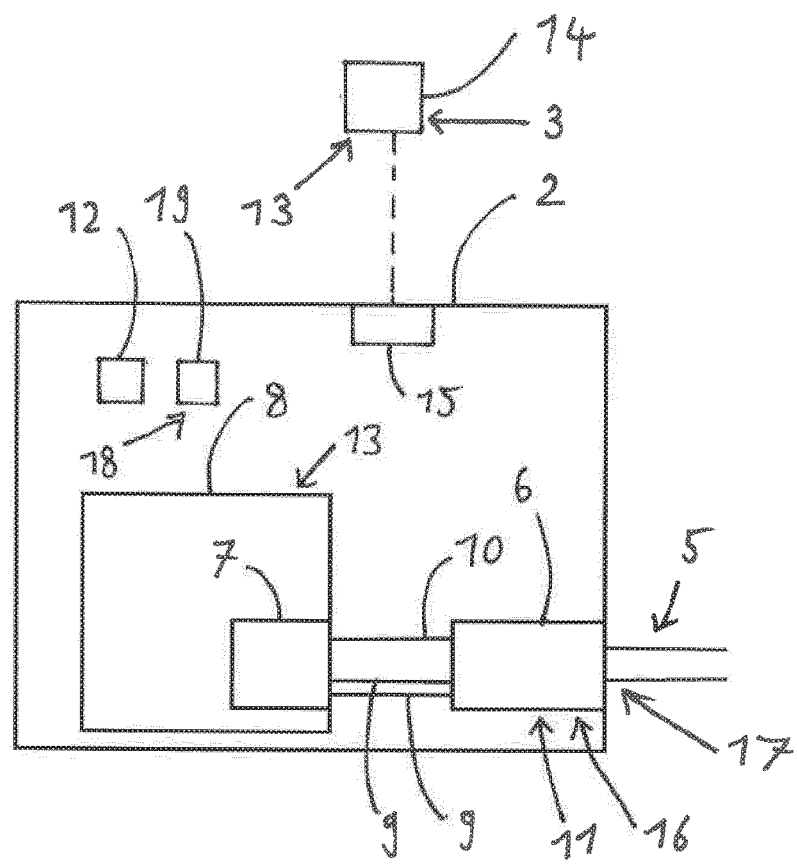
FIG. 2 shows a schematic depiction of the Ethernet communication device having a media access control unit, a microcontroller and an external physical interface.

FIG. 2 shows the Ethernet communication device 2. The Ethernet communication device 2 has an external physical interface 6, a media access control unit 7 and a microcontroller 8. The interface 6 is connected to the media access control unit 7 via a data line 9 for data transmission purposes. Furthermore, the interface 6 is connected, according to the exemplary embodiment, to the media access control unit 7 via a configuration line 10 for data transmission purposes.

According to the exemplary embodiment, the media access control unit 7 is integrated in the microcontroller 8.

The media access control unit 7 is also referred to as MAC (media access control). The interface 6 is also referred to as PHY. The interface 6 denotes a special integrated circuit or a functional group of a circuit that is responsible for the coding and decoding of data between a purely digital system and a modulated analog system. PHY stands for physical interface (physical layer) in this case. The term can be found e.g. on the circuit diagrams of Ethernet boards. In particular, the interface 6 or the PHY is virtually the lowest possible interface after the cable of the on-board electrical system 5 to which the Ethernet communication device 2 is connected. Fully integrated Ethernet controller chips have a PHYceiver incorporated, which in particular also corresponds to a PHY. The PHY is preferably in the form of a semiconductor. It is used for digitally accessing the channel operated on a modulated basis. Typically, it is in the environment of the media access control unit 7, which is in a form independent of the interface.

On a side of the interface 6 that is remote from the data line 9 and the configuration line 10, the on-board electrical system 5 of the motor vehicle 1 is connected to the Ethernet communication device 2.

In an exemplary embodiment of a method, a special state 11 is first detected on the interface 6. The special state 11 is, in particular, detected as a result of, by way of example, a number of received message packets within a predetermined period being greater than a message packet limit value or else the Ethernet communication device 2 still being in a starting mode, or else a message packet memory 12 of the Ethernet communication device 2 being full and not being able to receive a further message packet. The special state 11 can alternatively exist if the Ethernet communication device 2 is in an update mode and, by way of example, a piece of operating software of the Ethernet communication device 2 is being updated or loaded.

The special state 11 is, according to the exemplary embodiment, detected by the microcontroller 8. That is to say that the microcontroller 8 can compare the present state of the Ethernet communication device 2 with reference states and thus detect the special state 11. As such, the microcontroller 8 can determine the number of message packets received within the predetermined period and compare it with the message packet limit value, for example. If the number is then greater than the message packet limit value, the special state 11 is detected. Furthermore, the microcontroller 8 can also set an update value or an update flag that indicates the update mode and as a result of which the special state 11 is in turn detected, for example. The microcontroller 8 can also detect if the message packet memory 12 is filled such that a further message packet cannot be received, for example.

If the special state 11 is detected, a control signal 13 is generated. According to the exemplary embodiment, the control signal 13 is generated by the microcontroller 8. The control signal 13 can alternatively be generated by an external microcontroller 14 that is in a form outside the Ethernet communication device 2. The external microcontroller 14 can be in a form in the further Ethernet communication device 3, for example.

If the control signal 13 is generated in the external microcontroller 14, then the control signal 13 is, according to the exemplary embodiment, transmitted to the Ethernet communication device 2 via a further external physical interface 15. The control signal 13 allows the interface 6 to be adapted. As such, the interface 6 can be deactivated or activated or put into a loop circuit 16 by the control signal 13, for example.

The control signal 13 then blocks at least one forwarding of a message packet 17 that arrives at the interface 6, coming from the on-board electrical system 5, to the media access control unit 7. The blocking can be performed by virtue of the interface 6 being deactivated or else by virtue of the interface 6 blocking the forwarding by the loop circuit 16. In the loop circuit 16, the message packet 17 is returned to the on-board electrical system 5 again, in particular to the sender of the message packet 17.

Figure 3:
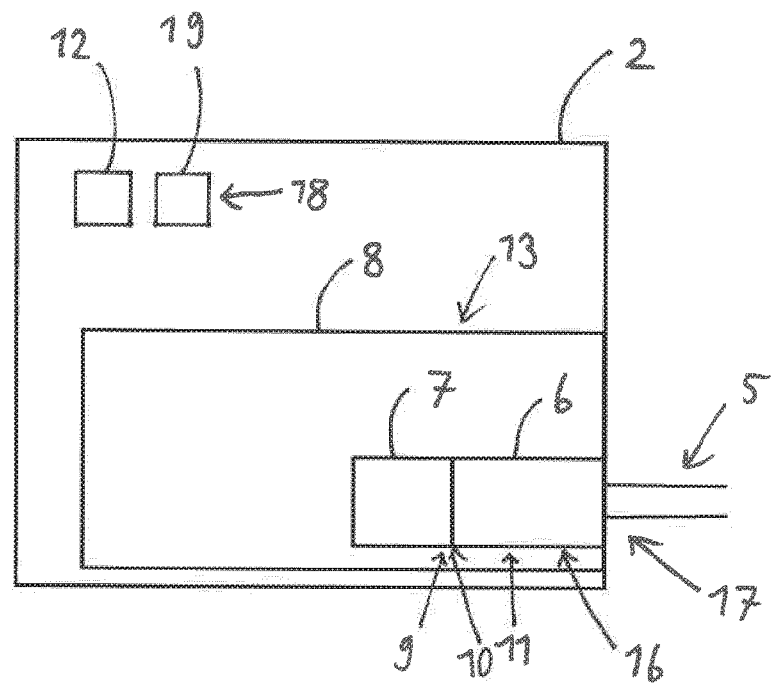
FIG. 3 shows a schematic depiction of a further exemplary embodiment of the Ethernet communication device having the media access control unit and the interface, which are integrated in a microcontroller of the Ethernet communication device.

FIG. 3 shows the Ethernet communication device 2 analogously to the exemplary embodiment from FIG. 2, but the interface 6 is integrated in the microcontroller 8. In this exemplary embodiment, there is in particular no provision for a separate power supply for the interface 6, which could easily be isolated. The interface 6 is supplied with power by the microcontroller 8. In this case, the interface 6 is preferably adapted by the loop circuit 16 if the special state 11 is detected.

Figure 4:
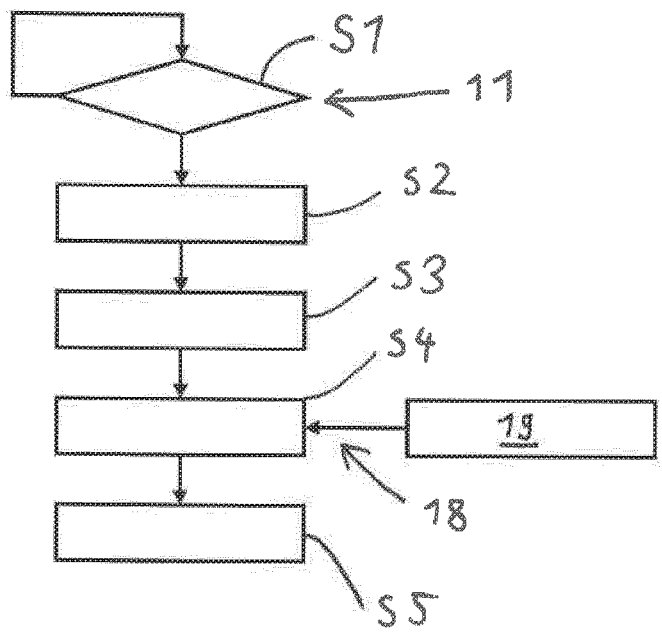
FIG. 4 shows a flowchart for the configuration of the interface in a special state.

FIG. 4 shows a flowchart for adapting the interface 6. In a step S1, the special state 11 is detected. The special state 11 can be an attack, an overload, an error, an anomaly, a departure from the specification or a buffer overflow, for example. If the special state 11 is not detected, step S1 is performed again. If the special state 11 is detected, on the other hand, there follows a step S2. In step S2, that interface 6 of the Ethernet communication device 2 via which the attack has come or on which the special state 11 is detected is determined. The interface 6 is in particular in the form of an MII (media independent interface). The interface 6 can alternatively be in the form of an SPI (serial peripheral interface), MDIO (management data input/output), RGMII (reduced gigabit media independent interface) or I2C (inter-integrated circuit). In particular, the interface 6 may not be an Ethernet interface, but rather can be for example an I2S, SPI, PCIe or the like that uses a different protocol or different addressing.

In particular, besides the interface 6 on which the special state 11 is detected, there is also the further interface 15, on which the special state 11 does not exist. The further interface 15 can also be used to receive the control signal 13 when necessary.

In a step S3, according to the exemplary embodiment, a connection to the interface 6 that is not affected by the attack or by the special state 11 is selected. As such, for example the configuration line 10 or the data line 9 can be selected in order to access the interface 6.

In a step S4, the interface 6 is adapted or reconfigured. To this end, the interface 6 is adapted using adaptation parameters 18. The adaptation parameters 18 are, according to the exemplary embodiment, provided from a secure memory 19 of the Ethernet communication device 2. The adaptation parameters 18 can thus be read from the secure memory 19 in step S4. The secure memory 19 is preferably in a form separate from the message packet memory 12.

In a step S5, the interface 6 is then configured or adapted, so that the forwarding of the message packet 17 from the interface 6 to the media access control unit 7 is blocked.

Figure 5:
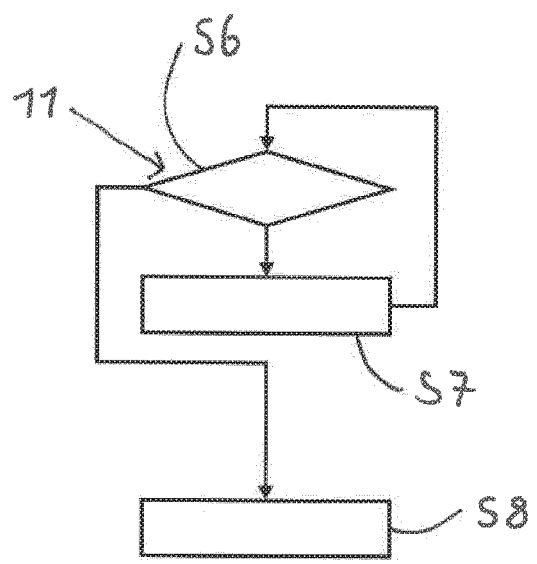
FIG. 5 shows a further flowchart for the operation of the Ethernet communication device when the special state is detected.

FIG. 5 shows a further flowchart for the method. In a step S6, it is determined whether the special state 11 still exists or has already expired again. If the special state 11 still exists, a step S7 is performed. In step S7, the deactivation of the interface 6 or the loop circuit 16 of the interface 6 is retained and there again follows step S6.

If it is discovered in step S6 that the special state 11 no longer exists, there follows a step S8. In step S8, a further control signal is used to activate the interface 6 or remove the loop circuit 16, for example.

Figure 6:
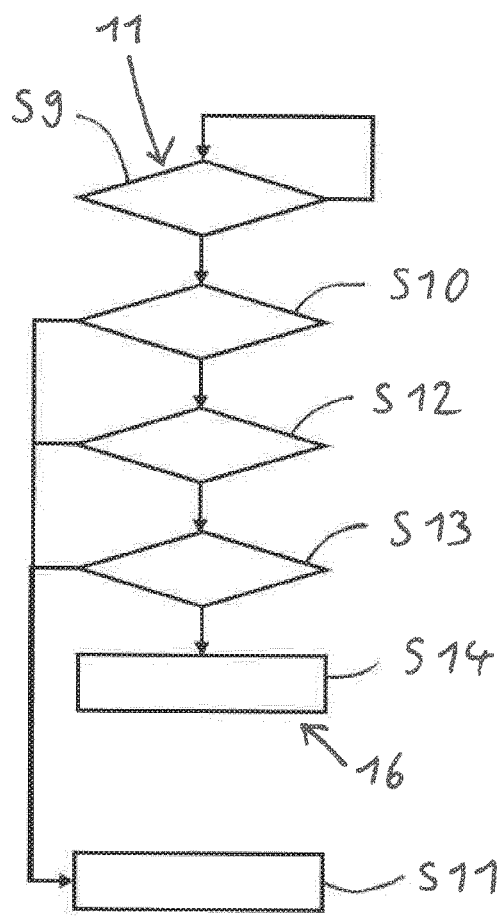
FIG. 6 shows a further flowchart for the decision between deactivation of the interface and loop circuit of the interface when the special state is detected.

FIG. 6 shows a further flowchart for the method. If the special state 11 is not detected in a step S9, there follows step S9 again, for example after a pause. If the special state 11 is detected, on the other hand, there follows a step S10. In step S10, a decision is made as to whether the interface 6 is important or unimportant. In particular, a decision is made as to whether or not the interface 6 is an important communication link. By way of example, the interface 6 is important if it is a backbone port carrying many different data streams in the middle of the on-board electrical system 5. If the interface 6 is unimportant, there follows a step S11. If the interface 6 is important, on the other hand, there follows a step S12.

In step S12, a decision is made as to whether the interface 6 can be reactivated or controlled from the outside, that is to say for example by the external microcontroller 14. If this is the case, there follows step S11. If this is not the case, there follows a step S13. In step S13, a requirement for a startup time or for a wakeup time of the interface 6 is checked. If the requirements for the startup time of the interface 6 are less than 250 ms, in particular less than 100 ms, that is to say if the interface 6 is supposed to be available again within less than 250 ms, in particular less than 100 ms, there follows a step S14. If this is not the case and the requirements for the startup time are less stringent, since the startup time of the interface 6 can be more than 250 ms, in particular 100 ms, there follows step S11.

In step S11, the interface 6 is deactivated or switched off. In particular, the deactivation of the interface 6 results in the supply of energy to the interface 6 being interrupted.

In step S14, the interface 6 is operated with the loop circuit 16. The interface 6 is thus put into a loop mode or loopback mode, in which the incoming message packet 17 is returned to a sender of the message packet 17.

LIST OF REFERENCE SIGNS

1 Motor vehicle
2 Ethernet communication device
3 Further Ethernet communication device
4 Control unit
5 On-board electrical system
6 Interface
7 Media access control unit
8 Microcontroller
9 Data line
10 Configuration line
11 Special state
12 Message packet memory
13 Control signal
14 External microcontroller 15 Further interface
16 Loop circuit
17 Message packet
18 Adaptation parameter
19 Secure memory

The invention claimed is:

1. A method for operating an Ethernet communication device of a motor vehicle, the Ethernet communication device having a media access control unit and a plurality of external physical interfaces, the method comprising:
   detecting a special state on at least one of the external physical interfaces;
   if the special state is detected, generating a control signal for adapting the interface in the special state; and
   blocking a forwarding of a message packet arriving at the interface in the special state to a media access control unit of the Ethernet communication device on a basis of the control signal.

2. The method according to claim 1, wherein the step of blocking the forwarding to the media access control unit comprises deactivating the interface.

3. The method according to claim 1, wherein the step of blocking the forwarding to the media access control unit comprises blocking with a loop circuit of the interface.

4. The method according to claim 1, which comprises detecting the special state if a number of received message packets within a predetermined period is greater than a message packet limit value.

5. The method according to claim 1, which comprises detecting the special state if the Ethernet communication device is still in a starting mode characterized by a loading process of the Ethernet communication device.

6. The method according to claim 1, which comprises detecting the special state if a message packet memory of the Ethernet communication device is full.

7. The method according to claim 1, which comprises detecting the special state if the Ethernet communication device is in an update mode.

8. The method according to claim 1, which comprises generating the control signal with a microcontroller integrated in the Ethernet communication device.

9. The method according to claim 1, which comprises generating the control signal with a microcontroller in a form external to the Ethernet communication device, and transmitting the control signal generated in the external microcontroller to the Ethernet communication device via an unblocked interface of interfaces of the Ethernet communication device.

10. The method according to claim 9, wherein the unblocked interface is not an Ethernet interface.

11. An Ethernet communication device for a motor vehicle, comprising:
    a media access control unit and at least one external physical interface;
    the Ethernet communication device being configured to block a forwarding of a message packet arriving at said at least one external physical interface in a special state of the Ethernet communication device to a media access control unit of the Ethernet communication device on a basis of a control signal.

12. The Ethernet communication device according to claim 11, wherein the special state is an update mode.

13. The Ethernet communication device according to claim 11, wherein the forwarding to the media access control unit is blocked via a loop circuit of the interface.

14. The Ethernet communication device according to claim 11, wherein the special state is an update mode and the forwarding to the media access control unit is blocked until a configuration of the communication device is complete.

* * * * *